United States Patent
Clark et al.

(10) Patent No.: US 7,630,582 B2
(45) Date of Patent: Dec. 8, 2009

(54) RENDERING OPTIMIZATION METHOD AND SYSTEM

(75) Inventors: Raymond Edward Clark, Georgetown, KY (US); Robert Lawrence Cook, Lexington, KY (US); Ning Ren, Lexington, KY (US); Martin Geoffrey Rivers, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 579 days.

(21) Appl. No.: 11/274,034

(22) Filed: Nov. 15, 2005

(65) Prior Publication Data

US 2007/0168939 A1    Jul. 19, 2007

(51) Int. Cl.
G06K 9/36 (2006.01)
G06K 15/00 (2006.01)

(52) U.S. Cl. .................. 382/291; 382/112; 358/3.12

(58) Field of Classification Search ............... 382/100, 382/112, 113, 135–140, 162, 168, 173, 176, 382/181, 182, 184, 188–189, 193–194, 203, 382/209, 231, 232, 256, 274, 276, 284, 286–291, 382/294, 305, 318; 358/1.15, 312; 715/207
See application file for complete search history.

(56) References Cited

U.S. PATENT DOCUMENTS

| | | | |
|---|---|---|---|
| 5,930,813 A * | 7/1999 | Padgett et al. ............... 715/207 |
| 5,982,951 A * | 11/1999 | Katayama et al. ........... 382/284 |
| 6,069,709 A | 5/2000 | Harrington |
| 6,219,149 B1 | 4/2001 | Kawata et al. |
| 6,504,955 B2 * | 1/2003 | Oomura et al. ............. 382/173 |
| 6,650,791 B1 * | 11/2003 | Cullen ........................ 382/294 |
| 7,386,188 B2 * | 6/2008 | Peterson ..................... 382/284 |
| 7,436,531 B2 * | 10/2008 | Plass et al. ................. 358/1.15 |

* cited by examiner

*Primary Examiner*—Seyed Azarian
(74) *Attorney, Agent, or Firm*—Grossman, Tucker, Perreault & Pfleger, PLLC

(57) ABSTRACT

A method includes receiving a plurality of objects included within a print job. A first object of the plurality of objects and a second object of the plurality of objects are processed to define a first overlapping region between the first and second objects. The first object is modified to remove the first overlapping region, thus generating a modified first object.

27 Claims, 5 Drawing Sheets

RENDERING OPTIMIZATION METHOD AND SYSTEM

TECHNICAL FIELD

This disclosure relates to printing devices and, more particularly, to methods and systems for rendering overlapping objects that are provided to printing devices.

BACKGROUND

Printing devices receive print jobs from various sources, such as computers directly attached to the printing device via a printer cable and/or computers indirectly attached to the printing device via a computer network.

Print jobs typically define a plurality of objects to be rendered on the various pages of the print job. Often, individual objects will overlap with other objects on the same page. For example, a gradient fill may be constructed by first rendering an object on the page that is the full size of the final object. Additional objects may then be rendered over the top of the first object, each of which may be slightly smaller and different in color than the object upon which it is rendered. This sequence may continue until the desired gradient fill is achieved for the final object. Unfortunately, this process results in portions of the original object being rendered multiple times, thus reducing the performance of the printing device.

SUMMARY OF THE DISCLOSURE

In one exemplary implementation, a method includes receiving a plurality of objects included within a print job. A first object of the plurality of objects and a second object of the plurality of objects are processed to define a first overlapping region between the first and second objects. The first object is modified to remove the first overlapping region, thus generating a modified first object.

One or more of the following features may be included. The modified first object and/or the second object may be rendered. The first overlapping region may be defined as the geometric intersection of the first and second objects. The first object may immediately precede the second object.

The second object and a third object of the plurality of objects may be processed to define a second overlapping region between the second and third objects. The second object may be modified to remove the second overlapping region, thus generating a modified second object. The modified second object and/or the third object may be rendered. The second overlapping region may be defined as the geometric intersection of the second and third objects.

An area for the first overlapping region may be determined and compared to a modification threshold. The first object may be modified in response to the area of the first overlapping region meeting or exceeding the modification threshold. An area for the second object may be determined and compared to a modification threshold. The first object may be modified in response to the area of the second object meeting or exceeding the modification threshold. A determination may be made concerning whether the second object is positioned within the first object. The first object may be modified in response to the second object being positioned within the first object.

The above-described method may be implemented via an integrated circuit and/or as a sequence of instructions executed by a processor.

The details of one or more exemplary implementations are set forth in the accompanying drawings and the description below. Other features and advantages will become apparent from the description, the drawings, and the claims.

DETAILED DESCRIPTION OF THE PREFERRED EMBODIMENTS

Figure 1:
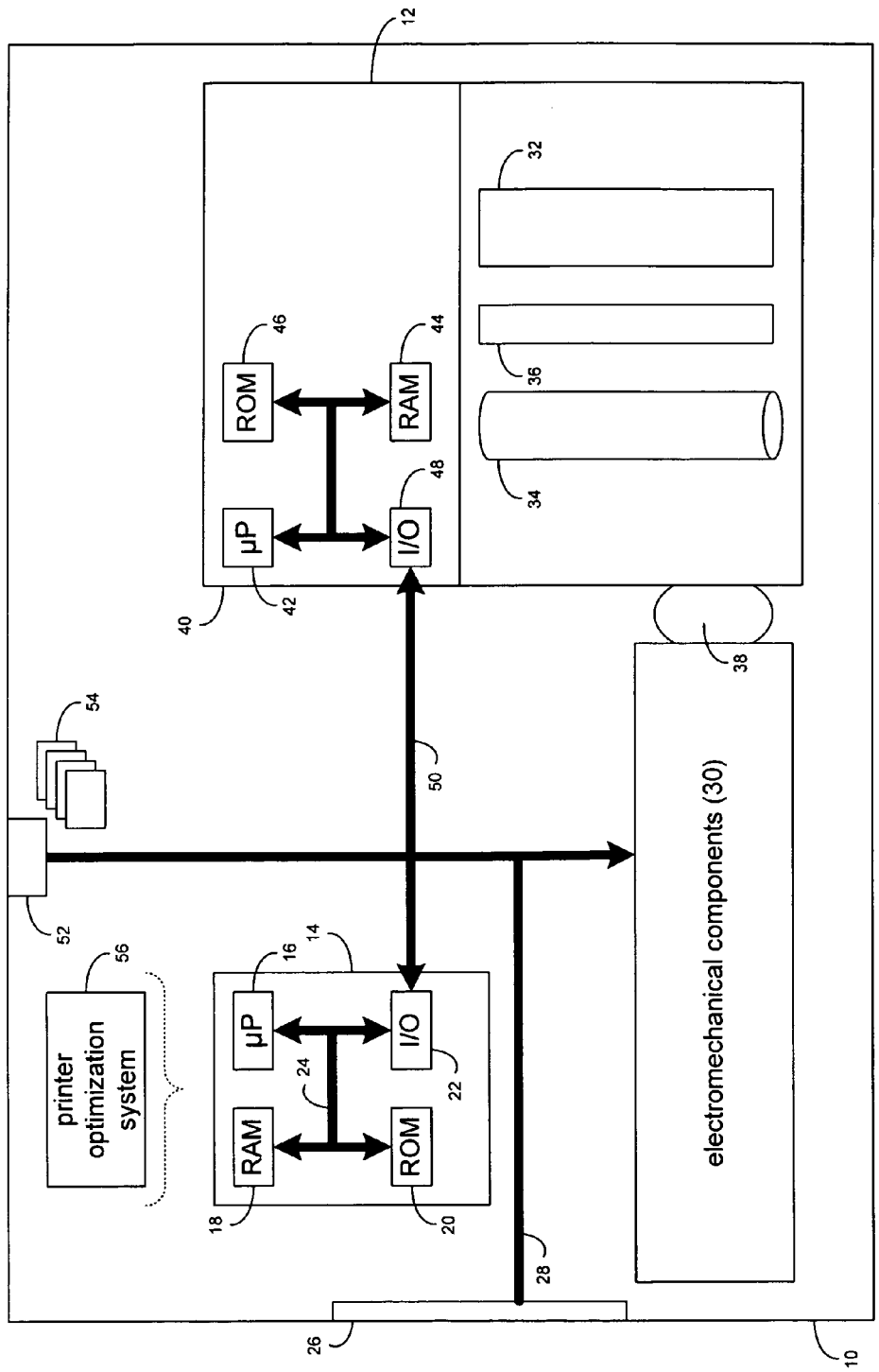
FIG. 1 is a diagrammatic view of a printing device.

Referring to FIG. 1, there is shown a printing device 10 and a printer cartridge 12 for use within printing device 10. Printing device 10 is typically coupled to a computing device (not shown) via e.g. a parallel printer cable (not shown), a universal serial bus cable (not shown), and/or a network cable (not shown). While printing device 10 is shown (in this example) to be a laser printer, other configurations are possible. For example, printing device 10 may be an inkjet printer, a photocopier, and/or an all-in-one unit.

Printing device 10 is a device that accepts text and graphic information from a computing device and transfers the information to various forms of media (e.g., paper, cardstock, transparency sheets, etc.). Further, printer cartridge 12 may be a component of printing device 10, which typically includes the consumables/wear components (e.g. toner, a drum assembly, and a fuser assembly, for example) of printing device 10. Printer cartridge 12 typically also includes circuitry and electronics (not shown) required to e.g., charge the drum and control the operation of printer cartridge 12.

Printing device 10 may include a system board 14 for controlling the operation of printing device 10. System board 14 may include a microprocessor 16, random access memory (i.e., RAM) 18, read only memory (i.e., ROM) 20, and an input/output (i.e., I/O) controller 22. Microprocessor 16, RAM 18, ROM 20, and I/O controller 22 may be coupled to each other via data bus 24. Examples of data bus 24 may include a PCI (i.e., Peripheral Component Interconnect) bus, an ISA (i.e., Industry Standard Architecture) bus, or a proprietary bus, for example.

Printing device 10 may include display panel 26 for providing information to a user (not shown). Display panel 26 may include e.g. an LCD (i.e. liquid crystal display) panel, one or more LEDs (i.e., light emitting diodes), and one or more switches. Display panel 26 may be coupled to I/O controller 22 of system board 14 via data bus 28. Examples of data bus 28 may include a PCI (i.e., Peripheral Component Interconnect) bus, an ISA (i.e., Industry Standard Architecture) bus, or a proprietary bus, for example. Printing device 10 may also include electromechanical components 30, such as: feed motors (not shown), gear drive assemblies (not shown), paper jam sensors (not shown), and paper feed guides (not shown), for example. Electromechanical components 30 may be coupled to system board 14 via data bus 28 and I/O controller 22.

As discussed above, printer cartridge 12 may include a toner reservoir 32, toner drum assembly 34, and fuser assembly 36, for example. Electromechanical components 30 may be mechanically coupled to printer cartridge 12 via a releasable gear assembly 38 that allows printer cartridge 12 to be removed from printing device 10.

Printer cartridge 12 may include a system board 40 that controls the operation of printer cartridge 12. System board 40 may include microprocessor 42, RAM 44, ROM 46, and I/O controller 48, for example. System board 40 may be releasably coupled to system board 14 via data bus 50, thus allowing for the removal of printer cartridge 12 from printing device 10. Examples of data bus 50 may include a PCI (i.e., Peripheral Component Interconnect) bus, an ISA (i.e., Industry Standard Architecture) bus, an I2C (i.e., Inter-IC) bus, an SPI (i.e., Serial Peripheral Interconnect) bus, or a proprietary bus.

Printer 10 may include one or more input ports 52 coupled to e.g., I/O controller 22 of system board 14. Input port 52 may be e.g., a parallel printer port, a USB (i.e., universal serial bus) port and/or a network interface port (i.e., for allowing printing device 10 to function as a network device within a computer network). Printer 10 may receive print jobs 54 via input port 52. As discussed above, print jobs typically define a plurality of objects to be rendered on the various pages of the print job. Often, individual objects will overlap with other objects on the same page.

Various types of objects may be included within a print job, such as: image objects (e.g., a photograph), text objects (e.g., the letter "M"), and fill objects (e.g., a crosshatch pattern for use as a background within a square).

Printing device 10 may execute a rendering optimization system 56 that processes received print jobs (e.g., print job 54) to improve efficiency when rendering overlapping objects.

The instruction sets and subroutines of rendering optimization system 56, which are typically stored on a storage device (e.g., ROM 20), may be executed by one or more processors (e.g., processor 16) and one or more memory architectures (e.g., RAM 18) incorporated into printing device 10. While the storage device is shown to be ROM 20, other configurations are possible. For example, the storage device may be, for example, a hard disk drive, a tape drive, an optical drive, a RAID array, and/or random access memory (RAM).

Figure 2:
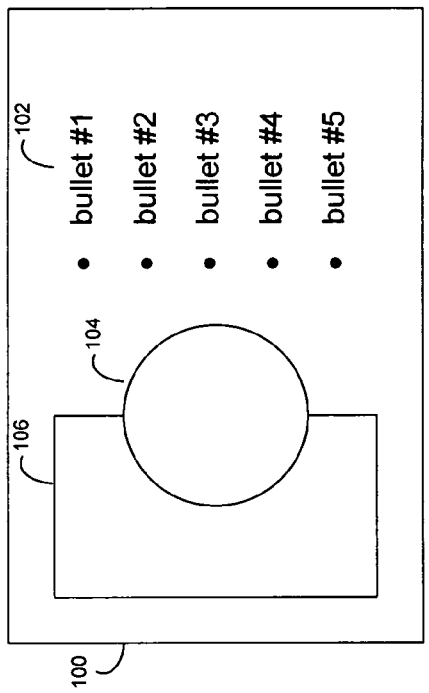
FIG. 2 is a diagrammatic view of a page of a presentation received by the printing device of FIG. 1.
Figure 5:
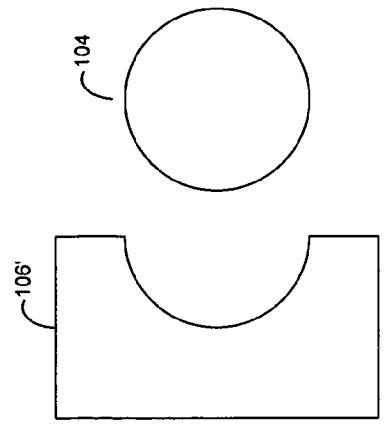
FIGS. 3-5 are additional diagrammatic views of the page of FIG. 2.
Figure 4:
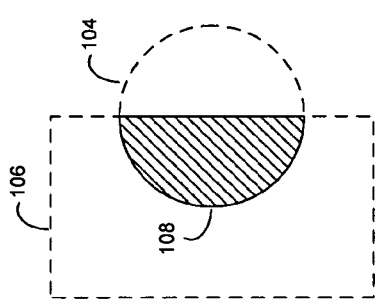
Figure 3:
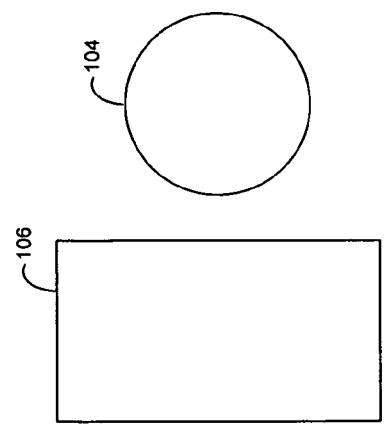

Referring also to FIG. 2, print job 54 may be a presentation that includes slide 100. In this exemplary presentation, slide 100 includes three objects namely, text object 102 (i.e., a bulleted list containing five bullet items), image object 104 (i.e., a circle), and image object 106 (i.e., a rectangle partially obscured by image object 104). Referring also to FIG. 3, image object 104 is shown offset to the right to unobscure image object 106. As shown in FIG. 4, when image objects 104, 106 (each shown in phantom) are properly positioned, a semicircular portion 108 of image object 106 is obscured by image object 104. Accordingly, when rendering image object 106, a modified image object 106' may be rendered that excludes semicircular portion 108, as this semicircular portion 108 is obscured by image object 104. Accordingly, the rendered combination of image object 104 and modified image object 106' will have the same appearance as the rendered combination of image object 104 and unmodified image object 106. However, as printing device 10 does not need to render semicircular portion 108, rendering efficiency may be improved.

Typically, when image objects are received by printing device 10, they are received in a compact format that allows for more efficient transfer from the computer (not shown) that is providing the print job. For example, an image object that is going to have a final rendered size of 300×300 pixels may be transferred to printing device 10 as a 100×100 pixel image object, with an image scaling factor of three. Accordingly, when rendering the image object, printing device 10 may enlarge the 100×100 pixel image object by a factor of three into a 300×300 image object. Additionally, when an image object is received for a particular page of a particular print job, an image geometry factor may properly locate the image object on the printed page. For example, for the above-described 300×300 pixel image object, an image geometry factor may locate the upper left-hand corner of the 300×300 pixel image object at 100 pixels to the right of the left-hand side of the printed page, and 100 pixels down from the top of the printed page. Accordingly, by examining the size of the original object, the image scaling factor, and the image geometry factor, rendering optimization system 56 may determine which (if any) objects overlap within a page of a print job.

Figure 6:
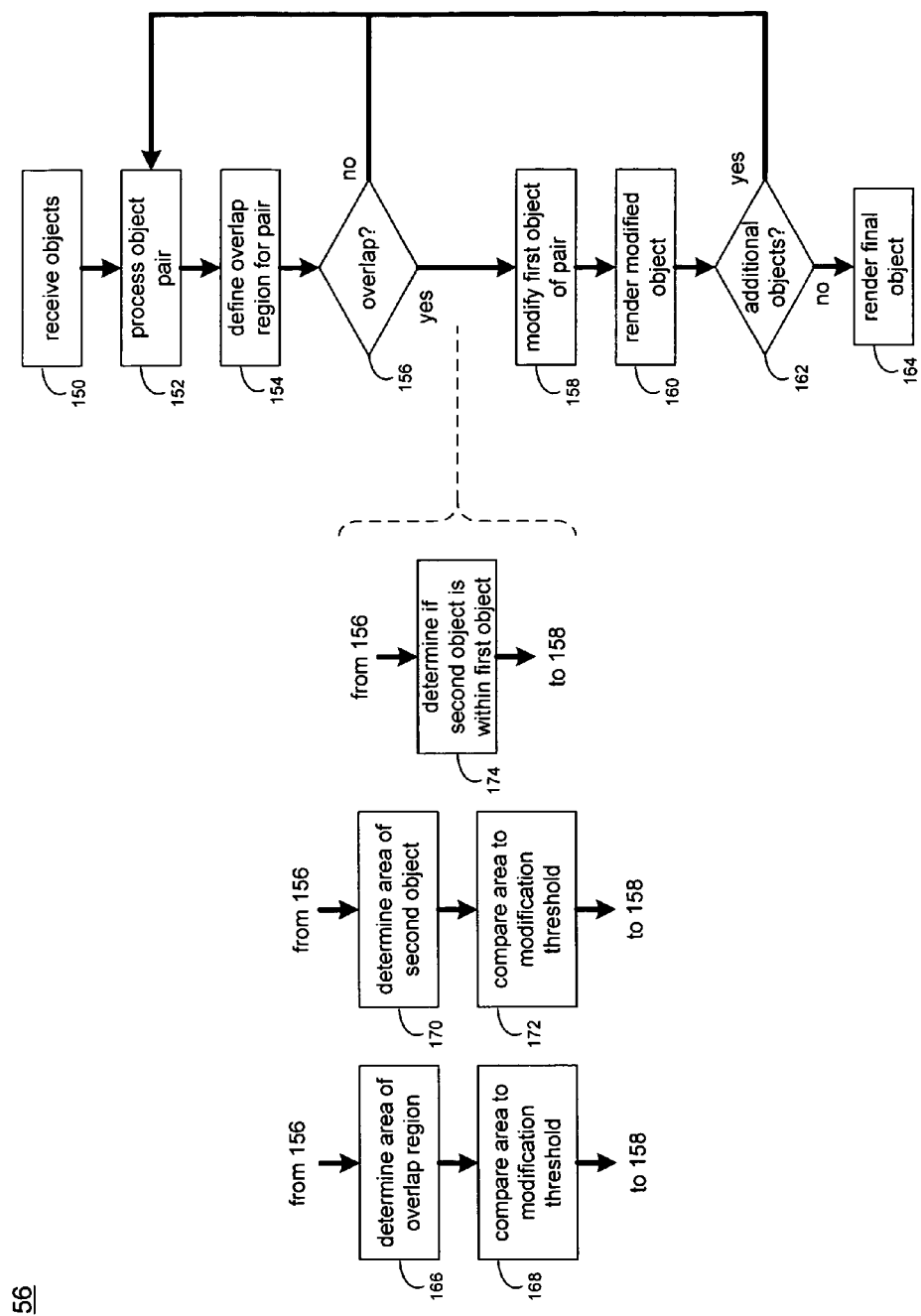
FIG. 6 is a flow chart of a process executed by the printing device of FIG. 1.
Figure 7:
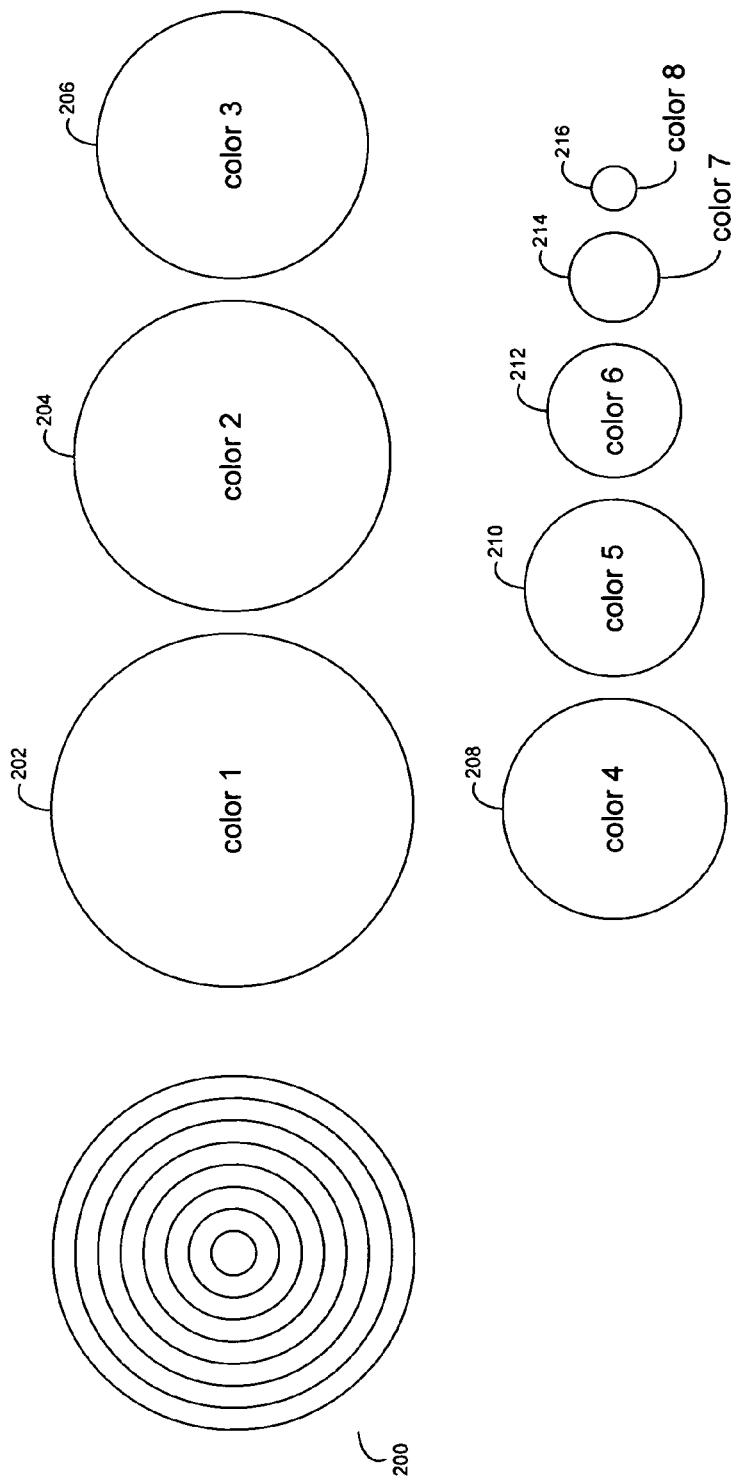
FIGS. 7-8 are diagrammatic views of a sphere comprising multiple overlapping objects.

Referring also to FIG. 6, upon printing device 10 receiving 150 a print job (e.g., print job 54) that includes a plurality of objects, rendering optimization system 56 may sequentially process the objects included within print job 54 to determine if the various objects overlap. For example and referring also to FIG. 7, assume that print job 54 includes a sphere 200 that includes a gradient fill pattern, thus giving sphere 200 a three-dimensional appearance. When print job 54 is provided to printing device 10, sphere 200 may be constructed of numerous image objects, each of which partially obscures the one below it. In this example, sphere 200 is shown to be constructed of eight separate image objects 202, 204, 206, 208, 210, 212, 214, 216. Typically, when creating a gradient fill by overlapping multiple objects, each object is a different color than the object upon which it is positioned. For example, in a grayscale gradient fill, object 202 may be black, object 216 may be white, and objects 204, 206, 208, 210, 212, 214 may be shades of gray; thus resulting in a gradual transition from black (i.e., about the periphery of sphere 200) to white (i.e., within the center of sphere 200).

Continuing with the above-stated example, when print job 54 is received by printing device 10, print job 54 includes eight objects 202, 204, 206, 208, 210, 212, 214, 216, which are sequentially received in order to allow for the proper rendering of the objects. For example, object 202 is first received and rendered; followed by object 204 that is rendered on top of object 202; followed by object 206 that is rendered on top of object 204. This process is continued until object 216 is rendered.

In order to avoid repetitive rendering of overlapping regions, rendering optimization system 56 may process 152 the adjacent object pairs received 150 within a print job to determine if the objects (within the pair of objects) overlap. For example, when object 204 is received 150, objects 202, 204.(i.e., an adjacent object pair) may be processed 152 to determine if object 204 overlaps object 202. When object 206 is received 150, objects 204, 206 (i.e., an adjacent object pair) may be processed 152 to determine if object 206 overlaps object 204. Further, when object 208 is received 150, objects 206, 208 (i.e., an adjacent object pair) may be processed to determine if object 208 overlaps object 206. This process may be continued until all of the objects received within a single page of print job 54 are processed.

When determining if objects overlap, rendering optimization system 56 may determine the geometric intersection of the pair of objects being processed, thus defining an overlapping region for the object pair.

Figure 8:
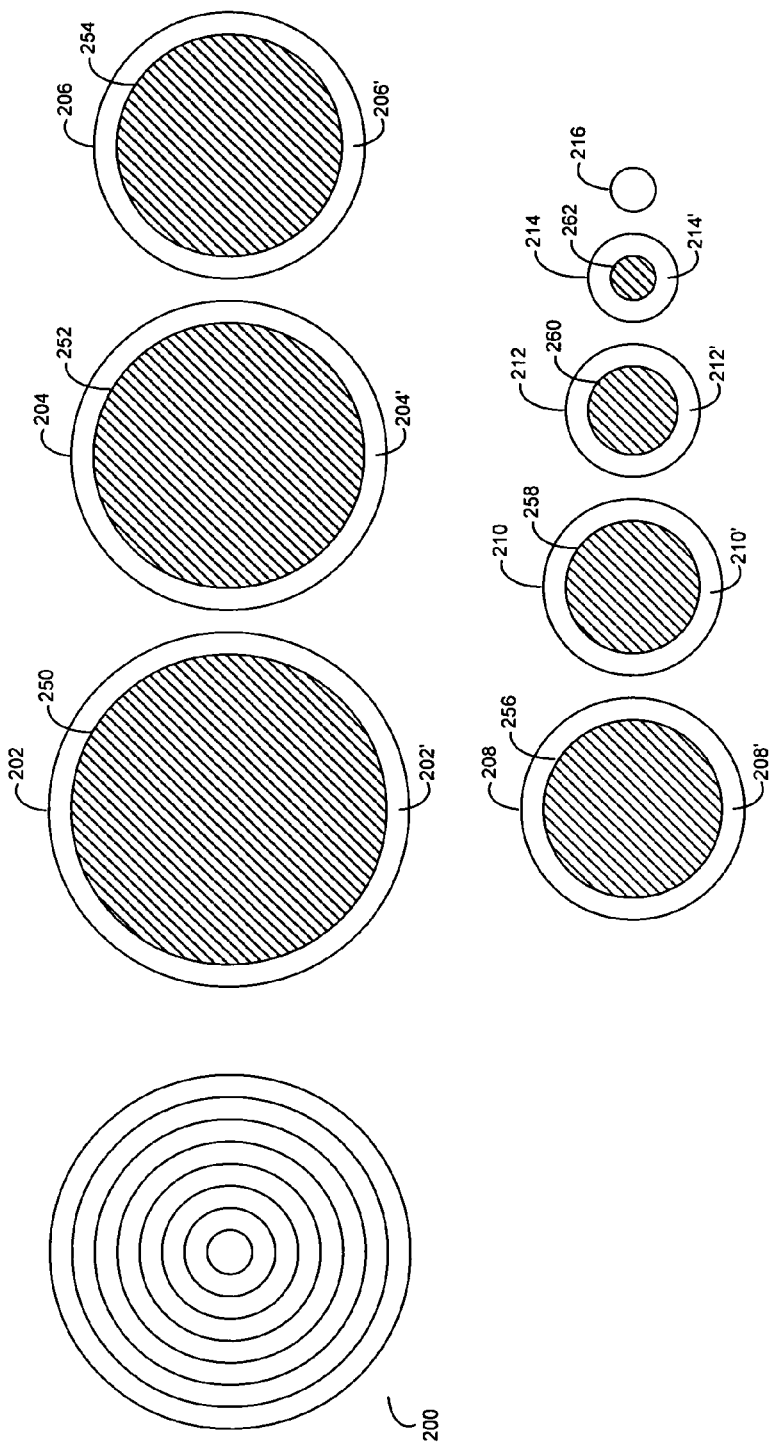

For example and referring also to FIG. 8, when receiving print job 54, objects 202, 204, 206, 208, 210, 212, 214, 216 are received 150 by rendering optimization system 56. When processing 152 objects 202, 204, rendering optimization system 56 may determine the geometrical intersection of objects 202, 204 to define 154 overlapping region 250.

When defining 154 the overlapping region for a pair of objects, in the event that the objects do not overlap, the overlapping region will be zero. Accordingly, if it is determined 160 that the overlapping region is zero, rendering optimization system 56 may process 152 the next object pair.

Since, in this example, object 204 is positioned within object 202, an overlapping region 250 is defined 154 that is the same size and shape as object 204. Rendering optimization system 56 may modify 158 object 202 to remove overlapping region 250, thus resulting in the generation of modified object 202' (i.e., a ring shaped object). Rendering optimization system 56 may then render 160 modified object 202'. Rendering is the process of converting the objects received by printing device 10 into the various PELs (i.e., pixel elements) that comprise the printed image produced by printing device 10.

As the area of modified object 202' is smaller than the area of unmodified object 202, modified object 202' may be rendered 160 more quickly than unmodified object 202. Additionally, as the overlapping portion 250 of object 202 is obscured by object 204, sphere 200 (once completely rendered) will appear the same regardless of whether modified object 202' or unmodified object 202 is rendered.

Rendering optimization system 56 may determine 162 if additional objects need to be processed. Continuing with the above-stated example, while object pair 202, 204 was processed and modified object 202' was rendered, objects 206, 208, 210, 212, 214, 216 still need to be processed (in the above-stated example).

Accordingly, object pair 204, 206 may be processed 152 by rendering optimization system 56 to determine the geometrical intersection of objects 204, 206, which defines 154 overlapping region 252. Again, since object 206 (in this example) is positioned within object 204, overlapping region 252 is the same size and shape as object 206. Rendering optimization system 56 may modify 158 object 204 to remove overlapping region 252, thus resulting in the generation of modified object 204' (i.e., a ring shaped object). Rendering optimization system 56 may then render 160 modified object 204'. Again, as the area of modified object 204' is smaller than the area of unmodified object 204, modified object 204' may be rendered more quickly than unmodified object 204.

Rendering optimization system 56 may continue to process 152 subsequent object pairs (i.e., 206, 208; then 208, 210; then 210, 212; then 212, 214; then 214, 216) until all of the objects of the page of the print job (i.e., print job 54) are processed. This, in turn, may result in the definition 154 of overlapping regions 254, 256, 258, 260, 262. Further, rendering optimization system 56 may modify 158 objects 206, 208, 210, 212, 214 (to remove overlapping regions 254, 256, 258, 260, 262, respectively), thus resulting in the generation of modified objects 206', 208', 210', 212', 214' (respectively).

After rendering optimization system 56 processes 152 object pair 214, 216, defines overlapping region 262, and modifies object 214 to remove overlapping region 262 and generate modified object 214', no additional objects are available for processing. Accordingly, upon determining 162 that no additional objects are available, rendering optimization system 56 may render 164 the final object received (i.e., object 216) in its unmodified form (as there are no additional objects to obscure any portion of object 216).

Prior to modifying 158 the first object of the object pair, rendering optimization system 56 may determine 166 the area of the overlapping region and compare 168 the area of the overlapping region to a modification threshold. For example, the modification threshold may be an area (e.g., one-hundred PELs). Accordingly, if the overlapping region is e.g., one-hundred-twenty PEL's, rendering optimization system 56 may modify 158 the first object of the object pair. Alternatively, rendering optimization system 56 may process 152 the next object pair.

Alternatively/additionally, prior to modifying 158 the first object of the object pair, rendering optimization system 56 may determine 170 the area of the second object of the object pair and compare 172 the area of the second object to a modification threshold. For example, the modification threshold may be an area (e.g., one-hundred PELs). Accordingly, if the area of the second object is e.g., two-hundred PEL's, rendering optimization system 56 may modify 158 the first object of the object pair. Alternatively, rendering optimization system 56 may process 152 the next object pair.

Alternatively/additionally, prior to modifying 158 the first object of the object pair, rendering optimization system 56 may determine 174 if the second object is positioned within the first object (e.g., as object 204 is positioned within object 202). Accordingly, if the second object is positioned within the first object, rendering optimization system 56 may modify 158 the first object of the object pair. Alternatively, rendering optimization system 56 may process 152 the next object pair.

A number of implementations have been described. Nevertheless, it will be understood that various modifications may be made. Accordingly, other implementations are within the scope of the following claims.

What is claimed is:

1. A method for rendering objects provided to a printing device by a computer executable process stored in a computer readable storage medium, comprising:
   receiving a plurality of objects included within a print job;
   processing sequentially a first object of the plurality of objects and a second object of the plurality of objects to define a first overlapping region between the first and second objects, wherein the first object and the second object constitute an adjacent object pair;
   determining an area for the second object; and
   comparing the area of the second object to a modification threshold: and
   modifying the first object to remove the first overlapping region, thus generating a modified first object, wherein the first object is modified in response to the area of the second object meeting or exceeding the modification threshold.

2. The method of claim 1 further comprising:
   rendering the modified first object; and
   rendering the second object.

3. The method of claim 1 wherein the first overlapping region is defined as the geometric intersection of the first and second objects.

4. The method of claim 1 wherein the first object immediately precedes the second object.

5. The method of claim 1 further comprising:
   processing the second object and a third object of the plurality of objects to define a second overlapping region between the second and third objects; and
   modifying the second object to remove the second overlapping region, thus generating a modified second object.

6. The method of claim 5 further comprising:
   rendering the modified second object; and
   rendering the third object.

7. The method of claim 5 wherein the second overlapping region is defined as the geometric intersection of the second and third objects.

8. The method of claim 1 further comprising:
determining an area for the first overlapping region; and
comparing the area of the first overlapping region to a modification threshold;
wherein the first object is modified in response to the area of the first overlapping region meeting or exceeding the modification threshold.

9. The method of claim 1 further comprising:
determining if the second object is positioned within the first object;
wherein the first object is modified in response to the second object being positioned within the first object.

10. A computer program product residing on a computer readable medium having a plurality of instructions stored thereon which, when executed by a processor, cause the processor to:
receive a plurality of objects included within a print job;
process sequentially a first object of the plurality of objects and a second object of the plurality of objects to define a first overlapping region between the first and second objects, wherein the first object and the second object constitute an adjacent object pair;
determining an area for the second object; and
comparing the area of the second object to a modification threshold: and
modify the first object to remove the first overlapping region, thus generating a modified first object, wherein the first object is modified in response to the area of the second object meeting or exceeding the modification threshold.

11. The computer program product of claim 10 further comprising instructions for:
rendering the modified first object; and rendering the second object.

12. The computer program product of claim 10 wherein the first overlapping region is defined as the geometric intersection of the first and second objects.

13. The computer program product of claim 10 wherein the first object immediately precedes the second object.

14. The computer program product of claim 10 further comprising instructions for:
processing the second object and a third object of the plurality of objects to define a second overlapping region between the second and third objects; and
modifying the second object to remove the second overlapping region, thus generating a modified second object.

15. The computer program product of claim 14 further comprising instructions for:
rendering the modified second object; and
rendering the third object.

16. The computer program product of claim 14 wherein the second overlapping region is defined as the geometric intersection of the second and third objects.

17. The computer program product of claim 10 further comprising instructions for:
determining an area for the first overlapping region; and
comparing the area of the first overlapping region to a modification threshold;
wherein the first object is modified in response to the area of the first overlapping region meeting or exceeding the modification threshold.

18. The computer program product of claim 10 further comprising instructions for:
determining if the second object is positioned within the first object;
wherein the first object is modified in response to the second object being positioned within the first object.

19. A printing device including an integrated circuit configured for:
receiving a plurality of objects included within a print job;
processing sequentially a first object of the plurality of objects and a second object of the plurality of objects to define a first overlapping region between the first and second objects, wherein the first object and the second object constitute an adjacent object pair;
determining an area for the second object; and
comparing the area of the second object to a modification threshold: and
modifying the first object to remove the first overlapping region, thus generating a modified first object, wherein the first object is modified in response to the area of the second object meeting or exceeding the modification threshold.

20. The printing device of claim 19 wherein the integrated circuit is further configured for: rendering the modified first object; and rendering the second object.

21. The printing device of claim 19 wherein the first overlapping region is defined as the geometric intersection of the first and second objects.

22. The printing device of claim 19 wherein the first object immediately precedes the second object.

23. The printing device of claim 19 wherein the integrated circuit is further configured for:
processing the second object and a third object of the plurality of objects to define a second overlapping region between the second and third objects; and
modifying the second object to remove the second overlapping region, thus generating a modified second object.

24. The printing device of claim 23 wherein the integrated circuit is further configured for:
rendering the modified second object; and
rendering the third object.

25. The printing device of claim 23 wherein the second overlapping region is defined as the geometric intersection of the second and third objects.

26. The printing device of claim 19 wherein the integrated circuit is further configured for:
determining an area for the first overlapping region; and
comparing the area of the first overlapping region to a modification threshold;
wherein the first object is modified in response to the area of the first overlapping region meeting or exceeding the modification threshold.

27. The printing device of claim 19 wherein the integrated circuit is further configured for:
determining if the second object is positioned within the first object;
wherein the first object is modified in response to the second object being positioned within the first object.

* * * * *